United States Patent [19]

Schreckenberg et al.

[11] 4,217,437
[45] Aug. 12, 1980

[54] PROCESS FOR THE PREPARATION OF CARBONIC ACID BIS-DIPHENOL ESTERS OF POLYALKYLENE OXIDE-DIOLS LENGTHENED VIA CARBONATE GROUPS AND THEIR USE FOR THE PREPARATION OF HIGH-MOLECULAR, SEGMENTED POLYETHER/POLYCARBONATES WHICH CAN BE PROCESSED AS THERMOPLASTICS

[75] Inventors: Manfred Schreckenberg; Dieter Freitag, both of Krefeld; Christian Lindner, Cologne; Carlhans Suling; Herbert Bartl, both of Odenthal; Klaus Konig, Leverkusen, all of Fed. Rep. of Germany

[73] Assignee: Bayer Aktiengesellschaft, Leverkusen, Fed. Rep. of Germany

[21] Appl. No.: 913,773

[22] Filed: Jun. 8, 1978

[30] Foreign Application Priority Data

Jun. 11, 1977 [DE] Fed. Rep. of Germany ....... 2726416

[51] Int. Cl.$^2$ ............................................. C08G 63/62
[52] U.S. Cl. .................................... 528/171; 260/463; 264/204; 525/469; 528/469; 528/174; 528/196; 528/199; 528/202
[58] Field of Search ............... 528/196, 198, 219, 199, 528/202, 171, 174; 525/469; 260/463, 860

[56] References Cited

U.S. PATENT DOCUMENTS

| | | | |
|---|---|---|---|
| 3,030,331 | 4/1962 | Goldberg | 260/42 |
| 3,030,335 | 4/1962 | Goldberg | 260/47 |
| 3,069,385 | 12/1962 | Stevens | 260/47 |
| 3,161,615 | 12/1964 | Goldberg | 260/47 |
| 3,169,121 | 2/1965 | Goldberg | 260/47 |
| 3,207,814 | 9/1965 | Goldberg | 260/860 |
| 3,220,976 | 11/1965 | Goldberg | 260/47 |
| 3,287,442 | 11/1966 | Caldwell | 260/858 |
| 3,290,409 | 12/1966 | Munro | 260/860 |
| 3,449,467 | 6/1969 | Wynstra | 260/850 |
| 3,461,187 | 8/1969 | Cantrill | 260/873 |
| 3,549,682 | 12/1970 | Vernaleren et al. | 260/463 |
| 3,553,167 | 1/1971 | Schnell et al. | 260/47 |
| 3,714,125 | 1/1973 | Shima et al. | 260/75 M |
| 3,843,708 | 10/1974 | Matzner | 260/463 |
| 3,843,752 | 10/1974 | Katayama et al. | 260/873 |
| 4,105,633 | 8/1978 | Swart et al. | 528/176 |

FOREIGN PATENT DOCUMENTS

| | | |
|---|---|---|
| 1964998 | 7/1977 | Fed. Rep. of Germany . |
| 2650533 | 5/1978 | Fed. Rep. of Germany . |
| 2235965 | 6/1973 | France . |
| 898775 | 6/1962 | United Kingdom . |
| 954500 | 4/1964 | United Kingdom . |
| 965085 | 7/1964 | United Kingdom . |
| 1074204 | 6/1967 | United Kingdom . |
| 1139413 | 1/1969 | United Kingdom . |
| 1190303 | 5/1970 | United Kingdom . |
| 1270077 | 4/1972 | United Kingdom . |
| 1422676 | 1/1976 | United Kingdom . |

OTHER PUBLICATIONS

Journal of Polymer Science: Part C, No. 4, pp. 707–730, (1963), Goldberg.
Journal of Polymer Science: Part A, vol. 3, pp. 2189–2203, (1965), Merrill.
Journal of Polymer Science, vol. 55, pp. 343–352, (1961).

Primary Examiner—Theodore E. Pertilla
Attorney, Agent, or Firm—Gene Harsh; Lawrence S. Pope

[57] ABSTRACT

The present invention relates to the transesterification of the carbonic acid aryl esters obtainable according to German Published Patent Specification No. 2,650,533 with an excess of diphenol for the preparation of polyalkylene oxide-diol bis-diphenol carbonates lengthened via carbonate groups. The present invention also relates to the polyalkylene oxide-diol bis-diphenol carbonates, lengthened via carbonate groups, obtained according to the invention and their use for the preparation of polyether/polycarbonates. Finally, the present invention relates to the polyether/polycarbonates, obtained according to the invention, with an improved phase separation between the elastomeric segment and hard segment, which leads to better technological properties of the corresponding polycarbonate elastomers.

33 Claims, 1 Drawing Figure

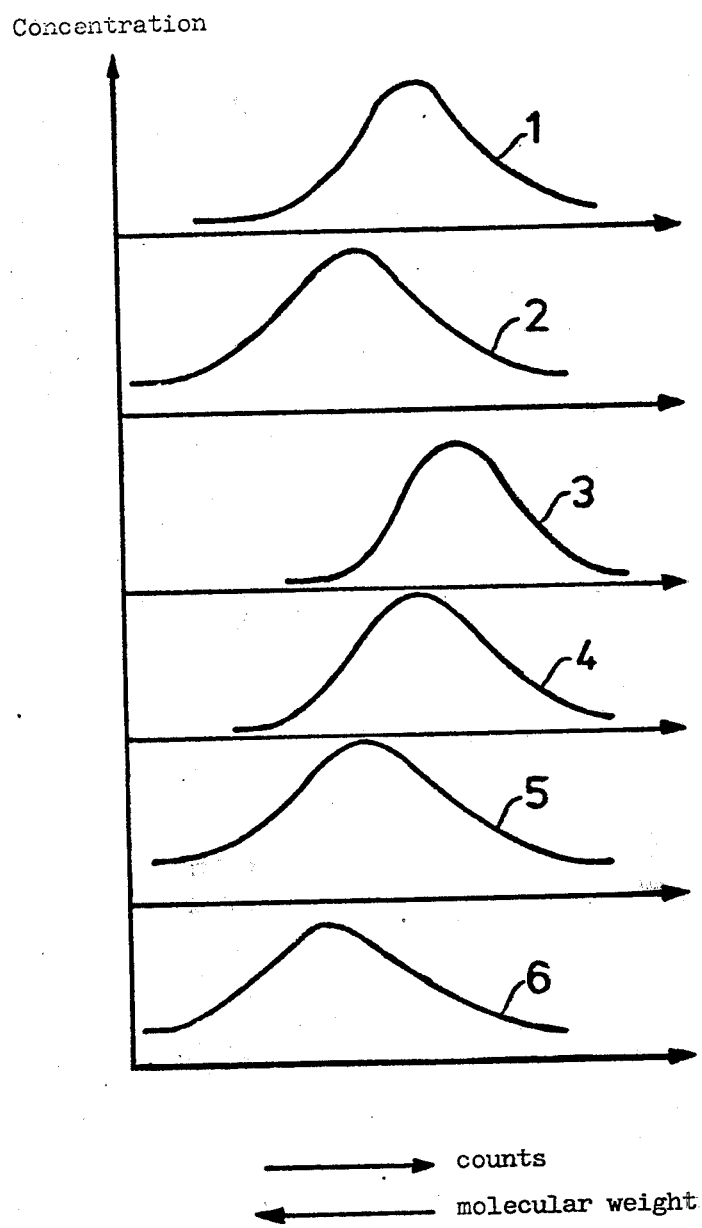

PROCESS FOR THE PREPARATION OF CARBONIC ACID BIS-DIPHENOL ESTERS OF POLYALKYLENE OXIDE-DIOLS LENGTHENED VIA CARBONATE GROUPS AND THEIR USE FOR THE PREPARATION OF HIGH-MOLECULAR, SEGMENTED POLYETHER/POLYCARBONATES WHICH CAN BE PROCESSED AS THERMOPLASTICS

BACKGROUND OF THE INVENTION

German Published Patent Specification No. 2,650,533 claims a process for the preparation of carbonic acid aryl esters of polyalkylene oxide-diols, lengthened via carbonate groups, from polyalkylene oxide-diols with a $\overline{M}n$ above about 135, preferably above about 800, and carbonic acid bis-aryl esters, which is characterized in that polyalkylene oxide-diols with molecular weights $\overline{M}n$ (number-average) above about 135 are heated together with carbonic acid bis-aryl esters, preferably at temperatures between about 100° C. and 200° C., in vacuo below about 35 mm Hg in the presence of catalysts, less than one mol of carbonic acid bis-aryl ester being employed per OH group, and the hydroxyaryl compound formed is distilled off.

Suitable polyalkylene oxide-diols are, in particular, those of the formula I

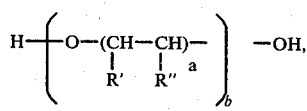

wherein
R' and R" independently of one another are H or $C_1$-$C_4$-alkyl,
a is an integer from about 1 to 6 and
b is an integer from about 3 to 350, in particular from about 3 to 250.

SUMMARY OF THE INVENTION

The present invention relates to a process for the preparation of polyalkylene oxide-diol bis-diphenol carbonates lengthened via carbonate groups, characterized in that polyalkylene oxide-diol bis-aryl carbonates lengthened via carbonate groups, which are obtainable according to German Published Patent Specification No. 2,650,533, are heated with diphenols at temperatures between about 100° C. and 200° C., preferably between about 110° C. and 180° C., in vacuo below about 35 mm Hg, preferably between about 25 mm Hg and 0.1 mm Hg, in the presence of catalysts, more than 1 mol of diphenol, preferably between about 1.1 mols and 2 mols of diphenol, being employed for one carbonic acid aryl ester group of the polyalkylene oxide-diol bis-aryl carbonate lengthened via carbonate groups, and the hydroxyaryl compound formed is distilled off.

The present invention also relates to the polyalkylene oxide-diol bis-diphenol carbonates, lengthened via carbonate groups, obtained by this process and their use for the preparation of polyether/polycarbonates and to the polyether/polycarbonates so obtained.

The trans-esterification of the polyalkylene oxide-diol bis-aryl carbonates, lengthened via carbonate groups, obtainable according to German Published Patent Specification No. 2,650,533 with excess diphenols to give the corresponding polyalkylene oxide-diol bis-diphenol carbonates, lengthened via carbonate groups, takes place surprisingly smoothly and without side reactions, even at reaction temperatures of up to 200° C. The molecular distribution given by the starting materials is not changed, polyalkylene oxide-diols are not re-formed and polycondensation to polycarbonates does not take place.

BRIEF DESCRIPTION OF THE DRAWING

The GPC curves of some polyalkylene oxide-diols and the GPC curves after lengthening them via —O-COO— groups and esterifying the terminal OH groups with diphenyl carbonate.

DETAILED DESCRIPTION OF THE INVENTION

A. Process for the preparation of polyalkylene oxide-diol bis-aryl carbonates, lengthened via carbonate groups.

The polyalkylene oxide-diol bis-aryl carbonates lengthened via carbonate groups, necessary for the preparation, according to the invention, of polyalkylene oxide-diol bis-diphenol carbonates lengthened via carbonate groups are prepared according to German Published Patent Specification No. 2,650,533.

German Published Patent Specification No. 2,650,533 relates to a process for the preparation of bis-carbonic acid monoaryl esters of polyalkylene oxide-diols, lengthened via —OCOO— groups, with a $\overline{M}n$ above about 135, preferably above about 800, and carbonic acid bis-aryl esters, characterized in that polyalkylene oxide-diols with molecular weights $\overline{M}n$ (number-average) above about 135, preferably above about 800, are heated with carbonic acid bis-aryl esters at temperatures between about 100° C. and 200° C., preferably between about 110° C. and 180° C., in vacuo below 35 mm Hg, preferably between about 25 and 0.1 mm Hg, in the presence of catalysts, less than one mol of carbonic acid bis-aryl ester being employed per OH group of the polyalkylene oxide-diol, and the hydroxyaryl compounds formed are distilled off.

German Published Patent Specification No. 2,650,533 further relates to the resulting bis-carbonic acid aryl esters of polyalkylene oxide-diols lengthened via —O-COO— groups.

Polyalkylene oxide-diols are, in particular, those of the formula I

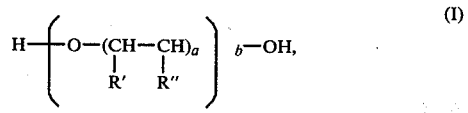

wherein
R' and R" independently of one another are H or $C_1$-$C_4$-alkyl,
a is an integer of from about 1 to 6, and
b is an integer of from about 3 to 350, in particular 3 to 250.

Suitable polyalkylene oxide-diols for the preparation are: Poly-(ethylene oxide) glycols, poly-(1,2-propylene oxide) glycols, poly-(1,3-propylene oxide) glycols, poly-(1,2-butylene oxide) glycols, poly-(tetrahydrofurane) glycols, the corresponding poly-(pentylene oxide) glycols, poly-(hexamethylene oxide) glycols, poly-(heptamethylene oxide) glycols, poly-(octamethylene oxide)

glycols, poly-(nonamethylene oxide) glycols and the copolymers or block copolymers of, for example, ethylene oxide and propylene oxide.

Carbonic acid bis-aryl esters are, in particular, those of the formula II

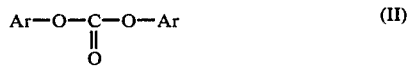  (II)

wherein

Ar is a substituted or unsubstituted aryl radical with 6 to 18 C atoms.

Possible substituents are, in particular, $C_1$—$C_4$-alkyls as well as nitro and halogen, such as, for example, chlorine or bromine. Examples of these compounds are diphenyl carbonate, alkyl-substituted diphenyl carbonates, such as di-toluyl carbonates, halogen-substituted diphenyl carbonates, such as di-chlorophenyl carbonates, dinaphthyl carbonate and alkyl-substituted and halogen-substituted dinaphthyl carbonates; in these compounds, the nitro, alkyl or halogen substituents on the two phenyl nuclei or, respectively, on the two naphthyl nuclei of the diaryl carbonates can be identical or different and can be symmetrical or asymmetrical to one another. Thus, for example, phenyl toluyl carbonate, phenyl chlorophenyl carbonate, 2-toluyl 4-toluyl carbonate or 4-toluyl 4-chlorophenyl carbonate are also suitable for the process according to the invention.

Bis-aryl carbonates of polyalkylene oxide-diols lengthened via —OCOO— groups are thus, in particular, those of the formula III

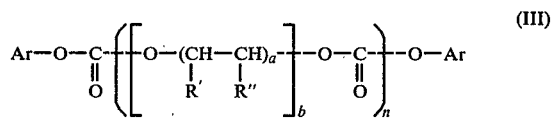  (III)

wherein

Ar, R', R", a and b have the above mentioned meaning and n denotes an integer from about 2 to 20, preferably from about 2 to 10.

Suitable catalysts for the process are the well-known transesterification catalysts, such as, for example, alkali metal phenolates or alkaline earth metal phenolates, alkali metal alcoholates or alkaline earth metal alcoholates and tertiary amines, such as, for example, triethylenediamine, morpholine, pyrrolidine, pyridine or triethylamine, or metal compounds, such as antimony trioxide, zinc chloride, titanium tetrachloride and titanic acid tetrabutyl ester.

The catalyst is used in amounts between about 20 ppm and 200 ppm, relative to the total weight of the polyalkylene oxide-polyol employed and the carbonic acid bis-aryl ester employed.

Less than these amounts of catalyst can also optionally be employed if the starting materials contain no basic impurities when acid catalysts are used and contain no acid impurities when basic catalysts are used. Amounts of catalyst which are as low as possible are to be preferred, in the interest of as slight an intrinsic color as possible in the carbonic acid esters, prepared according to the invention, of polyalkylene oxide-polyols.

The process is preferably carried out in bulk, that is to say in the absence of a solvent. However, solvents which are inert under the reaction conditions, such as aliphatic hydrocarbons or aromatic hydrocarbons, which can contain, for example, nitro groups, can also optionally be used.

The reaction time depends on the reaction temperature and the nature and amount of catalyst used and is between about 1 and 20 hours.

In the case of a discontinuous procedure, the hydroxyaryl compounds can be removed either during the reaction or after the reaction has ended. If the transesterification reaction is carried out by a continuous procedure, the hydroxyaryl compounds are separated off from the reaction mixture by fractional distillation.

According to a particularly preferred embodiment the reaction is carried out using sodium phenolate as the catalyst in a mixture of polyalkylene oxide-diol and carbonic acid bis-aryl ester at 110° C. to 150° C., less than one mol of carbonic acid bis-aryl ester being employed per OH group of the polyalkylene oxide-diol.

Thus, bis-carbonic acid monoaryl esters of polyalkylene oxide-diols lengthened via —OCOO— bridges can be prepared. In this process, it has been shown, surprisingly, that the lengthening proceeds smoothly, a quantative esterification of the terminal hydroxyl groups taking place simultaneously. In addition, it was surprising that the molecular non-uniformity of the starting polyalkylene oxide-diols remains virtually unchanged during the lengthening with simultaneous esterification.

The gel permeation chromatograms (GPC) of some of these bis-carbonic acid monoaryl esters and their starting materials are represented in diagram 1: curve (1) shows the gel permeation chromatogram (GPC) of polytetrahydrofurane-diol with a molecular weight $\overline{M}n$ of 2,000. Curve (2) shows the GPC thereof after doubling the $\overline{M}n$ to 4,000 and esterifying the terminal OH groups with diphenyl carbonate. Curve (3) shows the GPC of polytetrahydrofurane-diol with a molecular weight $\overline{M}n$ of 1,000; and curves (4), (5) and (6) show the GPCs thereof after doubling, quadrupling and sextupling the molecular weights $\overline{M}n$ to 2,000, 4,000 and 6,000 and esterifying the terminal OH groups. It can be seen that the molecular non-uniformity, which is determined by the width of the GPC curves at half the maximum value, remains virtually constant.

The desired molecular weight $\overline{M}n$ of a lengthened and esterified polyalkylene oxide-diol (III) is determined by the amount of the diaryl carbonate II reacted with the polyalkylene oxide-diol (I). It is generally applicable that n mols of (I) must be reacted with (n+1) mols of (II) in order to obtain a n-fold polyalkylene oxide-diol, lengthened via —OCOO— groups, with terminal aryl carbonate groups (n has the values indicated in formula III).

In addition to the polyalkylene oxide-diols, known polyalkylene oxide-triols and/or known polyalkylene oxide-tetraols with a Mn above about 135, preferably above about 800, can be simultaneously employed in molar amounts of up to about 50 mol %, relative to mols of polyalkylene oxide-diol employed. The carbonic acid aryl esters resulting from this have a branched structure.

In addition to the polyalkylene oxide-diols, polyalkylene oxide-mono-ols with a $\overline{M}n$ above about 135, preferably above about 800, can be simultaneously employed in molar amounts of up to about 50 mol %, relative to mols of polyalkylene oxide-diol employed. The carbonic acid aryl esters resulting from this accordingly have specific terminal groups.

In addition, both variations of the process can be combined.

The carbonic acid aryl esters obtainable by these variations, i.e. simultaneously using polyalkylene oxide-mono-ols and/or polyalkylene oxide-triols and/or polyalkylene oxide-tetraols, can be put to industrial use analogously to the carbonic acid aryl esters prepared only from polyalkylene oxide-diols lengthened via

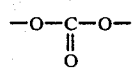

groups.

The average molecular weights given in the examples which follow are number-average $\overline{M}n$, which were determined by osmometry.

The Staudinger index $[\eta]_{THF}$ indicated was measured in tetrahydrofurane at 25° C. and is given in the formula dl/g. For the definition of the Staudinger index see: H. G. Elias: "Makromoleküle" ("Macromolecules"), Hüthig & Wepf-Verlag, Basle, page 265.

The separations by means of gel permeation chromatography were carried out in an apparatus from the IN-AP of Messrs. Bayer AG in tetrahydrofurane. For this, 4 Waters columns (each 1.2 m long) and Styragels (Waters designation: $10^7 + 10^6 + 10^5 + 10^4$) were used and elution was carried out at 28° C. using 0.5 ml/minute per 2.2 mg of polymer (concentration 1.5 g/l). The molecular non-uniformities can be calculated from the width of the gel chromatograms at half the maximum value, which widths were, in the case of molecularly uniform, anionically prepared polystyrenes, about 0.8 count (count=5 ml) (for this see: M. Hoffmann; H. Krömer; and R. Kuhn, Polymeranalytik (Polymer analysis), volume I, Georg Thiema Verlag, Stuttgart (1976)).

EXAMPLES

EXAMPLE 1

2,000 parts by weight of polytetrahydrofurane-diol with a molecular weight $\overline{M}n$ of 2,000 and with a GPC curve represented by curve (1) in diagram 1, 321 parts by weight of diphenyl carbonate, 0.1 part by weight of sodium phenolate and 0.2 part by weight of 2,6-di-tert.-butyl-p-cresol are heated, while stirring and under nitrogen and a vacuum of 6 mm Hg, at 110° C. for 1.5 hours, 130° C. for 2 hours and 150° C. for 2 hours; during this time, phenol is distilled off from the reaction mixture. If desired, residual traces of phenol can subsequently be separated off in a thin film evaporator at 190° C./0.1 mm Hg. A colorless viscous oil with a molecular weight $\overline{M}n$ of 4,200 and a Staudinger index $[\eta]_{THF}=0.24$ is obtained. The OH number is zero. The GPC curve of this product is given as curve (2) in diagram 1.

EXAMPLE 2

2,000 parts by weight of polytetrahydrofurane-diol with a molecular weight $\overline{M}n$ of 1,000 and with a GPC curve represented by curve (3) in diagram 1, 642 parts by weight of diphenyl carbonate, 0.12 part by weight of sodium phenolate and 0.2 part by weight of 2,6-di-tert.-butyl-p-cresol are heated, while stirring and under nitrogen and a vacuum of 3 mm Hg, at 110° C. for 1.5 hours, 130° C. for 2 hours and 150° C. for 2 hours. During this time, phenol is distilled off from the reaction mixture. If desired, residual traces of phenol can be subsequently separated off in a thin film evaporator at 190° C./0.1 mm Hg. A colorless viscous oil with a molecular weight $\overline{M}n$ of 2,200 and a Staudinger index $[\eta]_{THF}=0.143$ is obtained. The OH number is zero. The GPC curve of this product is given as curve (4) in diagram 1.

EXAMPLE 3

2,000 parts by weight of polytetrahydrofurane-diol with a molecular weight $\overline{M}n$ of 1,000 and with a GPC curve represented by curve (5) in diagram 1, 496 parts by weight of diphenyl carbonate, 0.12 part by weight of sodium phenolate and 0.2 part by weight of 2,6-di-tert.-butyl-p-cresol are heated, while stirring and under nitrogen and a vacuum of 1 mm Hg, at 150° C. for 6 hours. During this time, phenol is separated off from the reaction mixture by fractional distillation.

A colorless viscous oil, which solidifies to a wax on storing, with a molecular weight $\overline{M}n$ of 6,200 and a Staudinger index $[\eta]_{THF}=0.295$ is obtained. The OH number is zero. The GPC curve of this product is given as curve (6) in diagram 1.

EXAMPLE 4

2,047 parts by weight of polypropylene oxide-diol with a molecular weight $\overline{M}n$ of 2,000, 292 parts by weight of diphenyl carbonate, 0.1 part by weight of sodium phenolate and 0.2 part by weight of 2,6-di-tert.-butyl-p-cresol are heated, while stirring and under nitrogen and a vacuum of 2 mm Hg, at 110° C. for 1.5 hours, 130° C. for 2.5 hours and 150° C. for 1 hour; during this time, phenol is distilled off from the reaction mixture. If desired, residual traces of phenol can subsequently be separated off in a thin film evaporator at 190° C./0.1 mm Hg. A colorless viscous oil with a molecular weight $\overline{M}n$ of 4,200 and a Staudinger index $[\eta]_{THF}=0.18$ is obtained. The OH number is zero.

B. Process for the preparation of polyalkylene oxide-diol bis-diphenol carbonates, lengthened via carbonate groups.

The process according to the invention is characterized in that polyalkylene oxide-diol bis-aryl carbonates, lengthened via carbonate groups, which are prepared according to German Published Patent Specification No. 2,650,533 by heating polyalkylene oxide-diols with molecular weights $\overline{M}n$ (number-average) above about 135, preferably above about 800, with carbonic acid bis-aryl esters at temperatures between about 100° C. and 200° C., preferably between about 110° C. and 180° C., in vacuo below about 35 mm Hg, preferably between about 25 mm Hg and 0.1 mm Hg, in the presence of catalysts, less than one mol of carbonic acid bis-aryl ester being employed per OH group of the polyalkylene oxide-diol, and by distilling off the hydroxyaryl compound formed, are heated with diphenols at temperatures between about 100° C. and 200° C., preferably between about 110° C. and 180° C., in vacuo below about 35 mm Hg, preferably between about 25 mm Hg and 0.1 mm Hg, in the presence of catalysts, more than 1 mol of diphenol, preferably between about 1.1 mols and 2 mols of diphenol, being employed for one carbonic acid aryl ester group of the polyalkylene oxide-diol bis-aryl carbonate lengthened via carbonate groups, and the hydroxyaryl compound formed is distilled off.

The present invention also relates to polyalkylene oxide-diol bis-diphenol carbonates, lengthened via carbonate groups, obtained by this process and their use for the preparation of polyether/polycarbonates and the polyether/polycarbonates so obtained.

Suitable diphenols for the preparation, according to the invention, of polyalkylene oxide-diol bis-diphenol carbonates lengthened via carbonate groups are: hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) ketones, bis-(hydroxyphenyl) sulphones and α,α-bis-(hydroxyphenyl)-diisopropylbenzenes, as well as their nuclear-alkylated and nuclear-halogenated compounds. These and further suitable aromatic dihydroxy compounds are listed, for example, in U.S. Pat. Nos. 3,028,365, 2,999,835, 3,148,172, 3,271,368, 2,991,273, 3,271,367, 3,280,978, 3,014,891 and 2,999,846 and German Published Patent Specifications Nos. 2,063,050 and 2,211,957.

Examples of suitable diphenols are bis-(4-hydroxyphenyl)-methane, 4,4'-dihydroxydiphenyl, 2,4-bis-(4-hydroxyphenyl)-2-methylbutane, α,α-bis-(4-hydroxyphenyl)-p-diisopropylbenzene and 2,2-bis-(3,5-dimethyl-4-hydroxyphenyl)-propane.

Preferred diphenols are, for example, 2,2-bis-(4-hydroxyphenyl)-propane, 1,1-bis-(4-hydroxyphenyl)-cyclohexane, 2,2-bis-(3,5-dichloro-4-hydroxyphenyl)-propane and 2,2-bis-(3,5-dibromo-4-hydroxyphenyl)-propane.

One or several of the diphenols suitable according to the invention can be employed.

In particular, according to the instant invention, the polyalkylene oxide-diol bis-aryl carbonates prepared according to German Published Patent Specification No. 2,650,533 from polyalkylene oxide-diols of the formula I and carbonic acid bis-aryl esters of the formula II $$Ar-O-C-O-Ar \quad (II)$$
$$\parallel$$
$$O$$

wherein

Ar is a substituted or unsubstituted aryl radical with 6 to 18 C atoms, preferably phenyl, and which are of the formula III

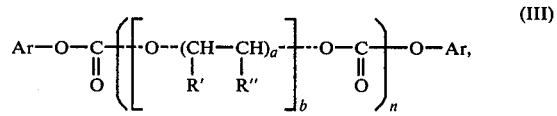

(III)

wherein n denotes an integer from 2 to 20, preferably 2 to 10, and

Ar, R', R", a and b have the meaning given for the formula I and II, are reacted with the diphenols of the following formula IV

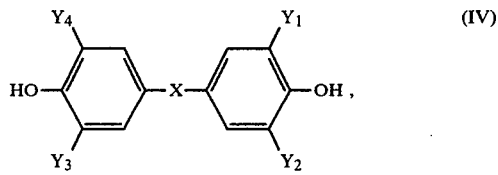

(IV)

wherein

X denotes —CH$_2$—,

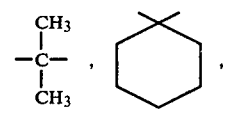

O, S or SO$_2$ and

Y$_1$ to Y$_4$ are identical or different and denote hydrogen or halogen, such as, for example, chlorine or bromine, to give the polyalkylene oxide-diol bis-diphenol carbonates, lengthened via carbonate groups, of the formula V

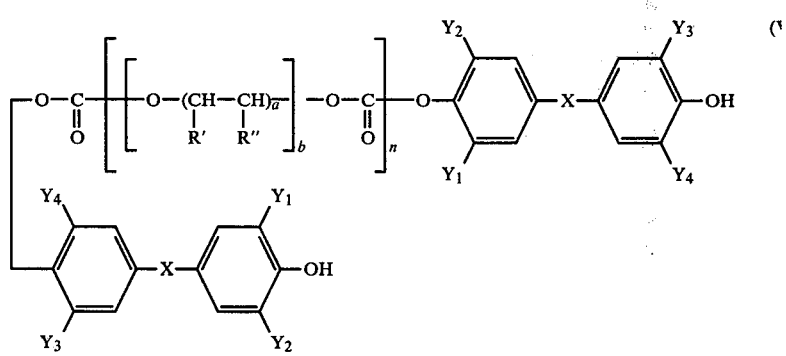

(V)

wherein n, R', R", a, b, X and Y$_1$ to Y$_4$ have the meaning given for the formulae III and IV.

Suitable catalysts for the preparation, according to the invention, of polyalkylene oxide-diol bis-diphenol carbonates lengthened via carbonate groups are the well-known transesterification catalysts, such as alkali metal phenolates or alkaline earth metal phenolates, alkali metal alcoholates or alkaline earth metal alcoholates, tertiary amines, such as for example, triethylenediamine, morpholine, pyrrolidine, triethylamine and tributylamine, and pyridine or metal compounds, such as, for example, antimony trioxide, zinc chloride, titanium tetrachloride and titanium tetrabutyl ester.

The catalyst is used in amounts of between about 10 ppm and 200 ppm, relative to the total weight of the particular polyalkylene oxide-diol bis-aryl carbonate, lengthened via carbonate groups, employed and of the particular diphenol employed.

Less than these amounts of catalyst can also optionally be employed if the starting materials contain no basic impurities when acid catalysts are used and contain no acid impurities when basic catalysts are used. Amounts of catalyst which are as low as possible are to be preferred, in the interest of as slight an intrinsic color as possible in the products according to the invention.

The process, according to the invention, for the preparation of polyalkylene oxide-diol bis-diphenol carbonates lengthened via carbonate groups is preferably carried out in bulk, that is to say in the absence of solvents. Solvents which are inert under the reaction conditions such as, for example, aliphatic hydrocarbons or aromatic hydrocarbons, which can be unsubstituted or substituted, for example, by nitro groups, can optionally be used.

The reaction time for the trans-esterification process for the preparation of polyalkylene oxide-diol bis-diphenol carbonates lengthened via carbonate groups is between about ½ and 24 hours, depending on the reaction temperature and on the nature and amount of the catalyst.

Polyalkylene oxide-diol bis-diphenol carbonates lengthened via carbonate groups are prepared, for example, by heating a mixture of a polyalkylene oxide-diol bis-phenyl carbonate, lengthened via carbonate groups, obtained according to German Published Patent Specification No. 2,650,533, a diphenol and a catalyst to temperatures between about 100° C. and 200° C., preferably between about 110° C. and 180° C., in vacuo and distilling off out of the reactor the phenol formed as the reaction progresses. In this procedure, the diphenol is employed in excess, more than one mol of diphenol, preferably between about 1.1 mols and 2 mols of diphenol, being used per carbonic acid phenyl ester group of the polyalkylene oxide-diol bis-phenyl carbonate. According to a particularly preferred embodiment, the reaction of a polyalkylene oxide-diol bis-phenyl carbonate, lengthened via carbonate groups, and bisphenol A in the molar ratio bis-phenyl carbonate to bisphenol A of 1:3 is reacted, using the disodium phenolate of bisphenol A as the catalyst, at 150° C. in vacuo between 25 and 0.1 mm Hg.

Polyalkylene oxide-diol bis-diphenol carbonates, lengthened via carbonate groups, according to the invention are thus, for example, those of the formulae Va–Vh:

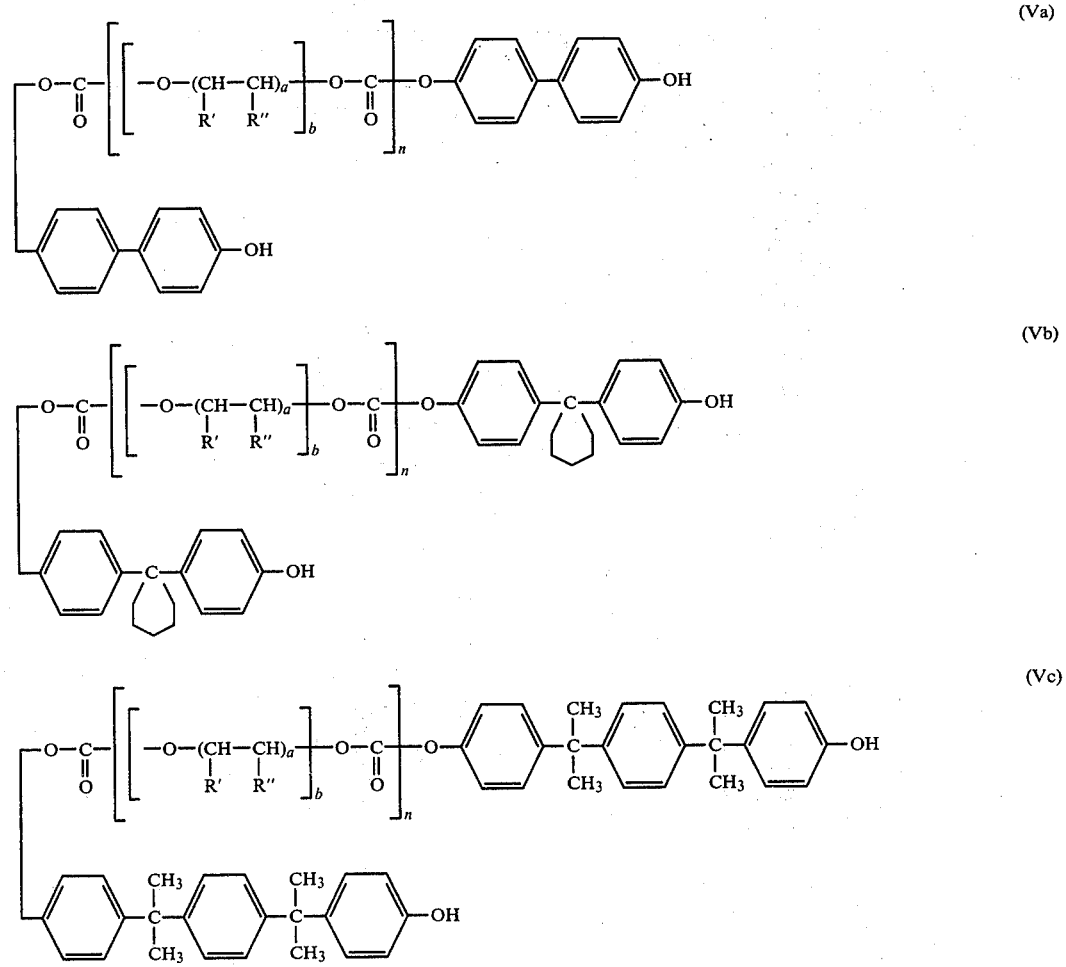

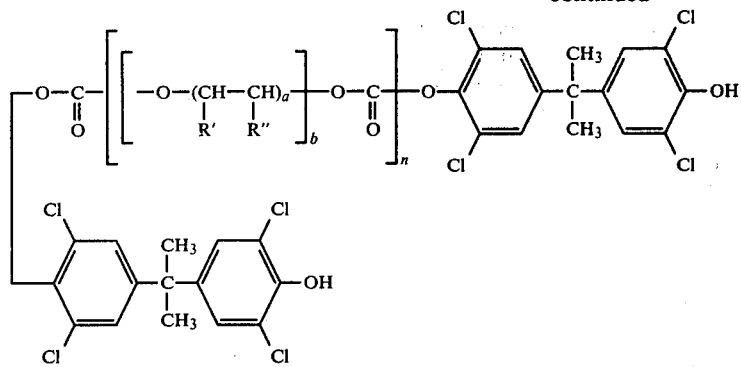
(Vd)
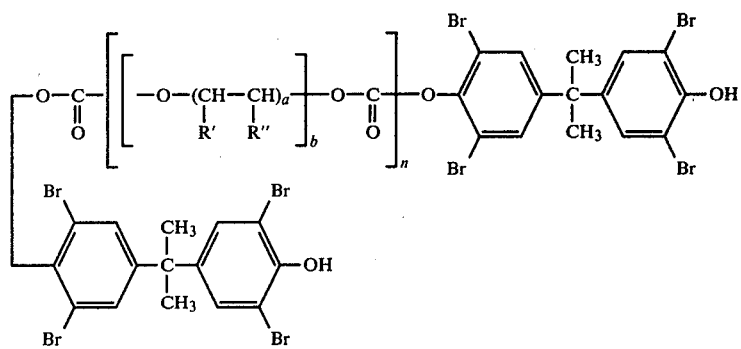
(Ve)
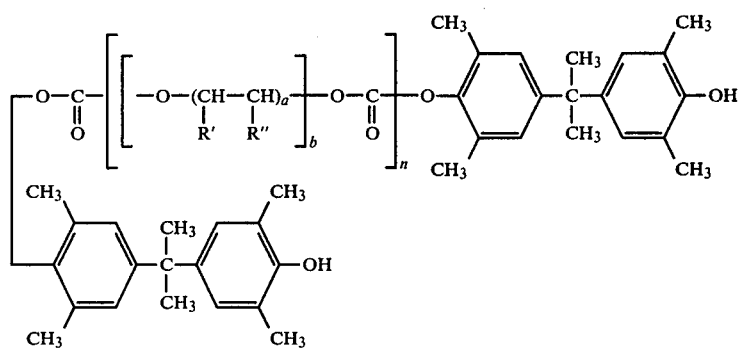
(Vf)
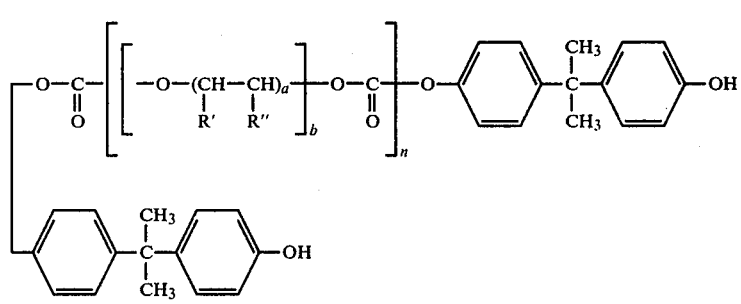
(Vg)
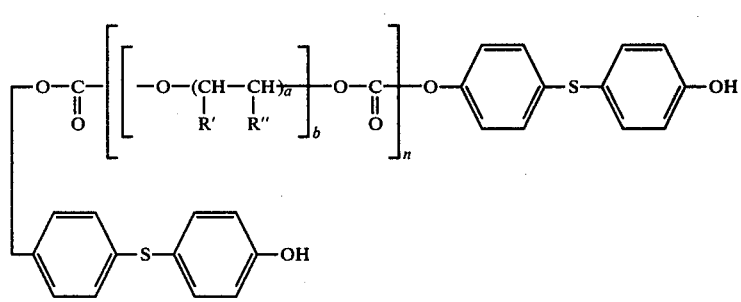
(Vh)

In the formulae Va to Vh, R', R", n, a and b have the meaning given for the formulae I and III.

C. Process for the preparation of polyether/polycarbonates.

The polyalkylene oxide-diol bis-diphenol carbonates, lengthened via carbonate groups, according to the invention can be used as starting bis-phenols in the preparation of polycarbonates by the known two-phase interface polycondensation process. Polyether/polycarbonates of a certain structure are thus obtained.

The process, according to the invention, for the preparation of these polyether/polycarbonates is characterized in that the polyalkylene oxide-diol bis-diphenol carbonates, lengthened via carbonate groups, according to the invention, in particular those of the formula V, are reacted with other diphenols, in particular with those of the formula IV, and with phosgene by the two-phase interface polycondensation process, known for the preparation of polycarbonates, at pH values between about 9 and 14 and temperatures between about 0° C. and 80° C., preferably between about 15° C. and 40° C. The amount of phosgene depends on the diphenol employed, the stirring action and the reaction temperature, and is in general about 1.1–3.0 mols of phosgene per mol of diphenol. The polyether/polycarbonates obtained according to the invention are characterized by the presence of an amorphous (elastomeric) polyether phase and a crystalline (hard) polycarbonate phase or an amorphous/crystalline (hard) polycarbonate phase.

From a morphological point of view, the polyether/polycarbonates have two different, spatially separate phases, that is to say regions which are composed of a continuous amorphous polyether phase and regions which are composed of a crystalline or amorphous/crystalline polycarbonate phase.

Compared with other polyether/polycarbonates, for example even compared with those of German Published Patent Specification No. 2,636,784, the high-molecular, segmented polyether/polycarbonates which can be processed as thermoplastics and which are prepared from polyalkylene oxide-diol bis-diphenol carbonates, lengthened via carbonate groups, have additional advantages, such as, for example, an even better phase separation, which leads to better technological properties of the corresponding polyether/polycarbonates.

Because they are multi-phase, the polyether/polycarbonates according to the invention have a higher heat distortion point than comparable single-phase polyether/polycarbonates.

Single-phase polyether/polycarbonates are described, for example, in U.S. Pat. No. 3,151,615. They are obtainable by various processes, but preferably by the "pyridine process" known from the preparation of polycarbonates.

The preparation of two-phase polymers, for example of polycarbonate/polycaprolactones, has hitherto only been achieved by means of bis-chloroformates of polycaprolactones and polycarbonate oligomers (see French Pat. No. 2,235,965).

This is also correspondingly true for the polyether/polycarbonates of German Published Patent Specification No. 1,162,559, although these are not identified as two-phase.

The use, according to the invention, of polyalkylene oxide-diol bis-diphenol carbonates, lengthened via carbonate groups, has, compared with the use of corresponding bis-chloroformates, the advantage of being insensitive towards hydrolysis and thus having a better storability, and of having clearly bifunctional reactivity.

In particular, because of their crystalline polycarbonate phase, the polyether/polycarbonates according to the invention have a higher heat distortion point.

It is possible to detect the different phases of the polyether/polycarbonates according to the invention with the aid of differential thermoanalysis, in which, for example, the polyether phase has a transformation temperature $<20°$ C., the amorphous constituent in the polycarbonate phase has a transformation temperature between about 100° C. and 150° C. and the crystalline constituent of the polycarbonate phase has a crystallite melting point between about 170° C. and 250° C.

In addition to their particular capacity for exposure to heat, the high-molecular, segmented polyether/polycarbonates, which can be processed as thermoplastics, prepared by the process according to the invention exhibit good transparency, highly elastic properties and an outstanding elongation at break of $>400\%$.

Other diphenols which are suitable for the preparation, according to the invention, of the polyether/polycarbonates from the polyalkylene oxide-diol bis-diphenol carbonates, lengthened via carbonate groups, according to the invention, are those which have already been mentioned for the preparation of polyalkylene oxide-diol bis-diphenol carbonates lengthened via carbonate groups, on page 13 of this Patent Application, in particular those of the formula IV on page 14 of this Patent Application; for example 4,4'-dihydroxy-diphenyl, bis-(4-hydroxyphenyl)-methane, 2,4-bis-(4-hydroxy-phenyl)-2-methylbutane, α, α-bis-(4-hydroxyphenyl)-p-diisopropylbenzene, 2,2-bis-(3-chloro-4-hydroxyphenyl)-propane, bis-(hydroxyphenyl) sulphide and 2,2-bis-(3,5-dimethyl-4-hydroxy-phenyl)-propane are suitable.

2,2-Bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis(4-hydroxyphenyl)-cyclo-hexane are preferably used as other diphenols for the preparation, according to the invention, of the polyether/polycarbonates. Any desired mixtures of these other diphenols can also be employed.

Branched products with better flow properties during processing are obtained by incorporating small amounts of trifunctional or more than trifunctional compounds, in particular those with three or more than three phenolic hydroxyl groups, preferably between about 0.05–2 mol % (relative to the diphenols employed).

Examples of suitable trifunctional or more than trifunctional compound are: phloroglucinol, 4,6-dimethyl-2,4,6-tri-(3-hydroxyphenyl)-hept-2-ene, 4,6-dimethyl-2,4,6-tri (4-hydroxyphenyl)-heptane, 1,3,5-tri(4-hydroxyphenyl)-benzene, 1,1,1-tri-(3-hydroxyphenyl)-ethane, tri-(4-hydroxyphenyl)-phenylmethane, 2,2-bis-[4,4-(4,4'-dihydroxydiphenyl)cyclohexyl]-propane, 2,4-bis-(4-hydroxyphenyl-isopropyl)-phenol, 2,6-bis-(2'-hydroxy-5'-methylbenzyl)-4-methyl-phenol, 2,4-dihydroxybenzoic acid, 2-(4-hydroxyphenyl)-2-(2,4-dihydroxy-phenyl)-propane and 1,4-bis-(4', 4"-dihydroxy-triphenyl-methyl)-benzene and 3,3-bis-(4-hydroxyphenyl)-2-oxo-2,3-dihydroindole as well as 3,3-bis-(3-methyl-4-hydroxyphenyl)-2-oxo-2,3-dihydroindole.

The polyether/polycarbonates according to the invention can also be branched via the polyether component, and in particular by reacting the carbonic acid aryl esters, lengthened via carbonate groups, of polyether-polyols, which are obtainable according to German Published Patent Specification No. 2,650,533 and have three or four aryl groups, with the above mentioned diphenols, triphenols and/or tetraphenols by the process of the present invention to give corresponding polyether-polyol poly-(polyphenol carbonates), and co-using the resulting polyphenols in the polyether/polycarbonate synthesis according to the present invention in molar amounts of up to about 50 mol %, relative to mols of polyether-diol bis-diphenol carbonates employed.

The chain length of the polyether/polycarbonates can be adjusted by adding a chain stopper, for example a monofunctional phenol, such as phenol, 2,6-dimethyl-phenol, p-bromophenol or p-tert.-butylphenol, it being possible to use between about 0.1 and 10 mol % of chain stopper per mol of diphenol employed.

The chain length of the polyether/polycarbonates can optionally be adjusted, for example, by adding polyethermonool mono-diphenol carbonates in molar amounts of up to about 50 mol %, relative to mols of polyether-diol bis-diphenol carbonates, lengthened via carbonate groups, employed.

The high-molecular, segmented polyether/polycarbonates which can be processed as thermoplastics are prepared by the two-phase interface polycondensation process. For this, one of the other diphenols mentioned above or mixtures of the other diphenols mentioned above are dissolved in an alkaline aqueous solution. The polyalkylene oxide-diol bisdiphenol carbonates, lengthened via carbonate groups, according to the invention, in particular those of the formula V, or their mixtures are likewise dissolved in a water-immiscible inert organic solvent and this solution is added. Phosgene is then passed into the mixture at a temperature between about 0° C. and 80° C., preferably between about 15° C. and 40° C., and at a pH value between about 9 and 14. After the phosgenation, the polycondensation is carried out by adding about 0.2–10 mol % of the tertiary aliphatic amine, relative to mols of diphenol. In this procedure, phosgenation times of between about 5 minutes and 90 minutes are required and polycondensation times of between about 3 minutes and 3 hours are required.

The present invention thus relates to the preparation of polyether/polycarbonates, which is characterized in that the polyalkylene oxide-diol bis-diphenol carbonates, lengthened via carbonate groups, according to the invention, in particular those of the formula V, are reacted with other diphenols, in particular those of the formula IV, and with phosgene in a liquid mixture consisting of an inert organic solvent and an alkaline aqueous solution, at temperatures between about 0° C. and 80° C., preferably between about 15° C. and 40° C., at a pH value between about 9 and 14, and after the addition of phosgene, polycondensation is carried out by adding about 0.2 mol % to 10 mol % of the tertiary aliphatic amine, relative to the molar amount of diphenol, the weight ratio of polyalkylene oxide-diol bis-diphenol carbonate, lengthened via carbonate groups, to the other diphenol being determined by the proportion of polycarbonate and the proportion of polyether in the polyether/polycarbonates.

The present invention thus relates to polyether/polycarbonates obtained by this process according to the invention.

The resulting solutions of the polyether/polycarbonates in the organic solvents are worked by analogously to the solutions of thermoplastic polycarbonates prepared by the two-phase interface process, the polyether/polycarbonates also being subjected to an after-treatment, and in particular they are either (a) isolated by known processes, for example by precipitating with methanol or ethanol, and then dried and tempered, or subjected to shearing forces or dissolved in organic solvents and allowed to gel, or (b) already subjected to shearing forces during isolation, for example in a devolatilization extruder, or (c) allowed to gel, before isolation, in the solvent used in the preparation of the polyether/polycarbonates by the two-phase interface process.

Suitable inert organic solvents for the preparation process, according to the invention, of the polyether/polycarbonates are water-immiscible aliphatic chlorohydrocarbons, such as methylene chloride, chloroform and 1,2-dichloroethane, or chlorinated aromatic compounds, such as chlorobenzene, dichlorobenzene and chlorotoluene, or mixtures of these solvents.

Suitable alkaline aqueous solutions for the process according to the invention are solutions of $Li(OH)_2$, NaOH, KOH, $Ca(OH)_2$ and/or $Ba(OH)_2$ in water.

Suitable tertiary aliphatic amines for the process according to the invention are those with about 3 to 15 C atoms, that is to say, for example, trimethylamine, triethylamine, n-tripropylamine and n-tributylamine, and varies between about 0.2–5 mol%, depending on the diphenol employed, and when tetramethyl substituted diphenols are employed, between about 5–10 mol %, in each case relative to the total molar amount of diphenols employed (= in each case the sum of polyalkylene oxide-diol bis-diphenol carbonates, lengthened via carbonate groups, and other diphenols).

The polyether/polycarbonates prepared by the process according to the invention can be isolated by the following processes:

(a) By distilling off the organic solvent down to a certain concentration, a high-strength (about 30–40% by weight) polymer solution being obtained, the polyether/polycarbonate gels on subsequent slow evaporation of the remaining solvent.

(b) By precipitating the polyether/polycarbonate from the organic phase using organic solvents, examples of suitable solvents for the precipitation being methanol, ethanol, isopropanol, acetone, aliphatic hydrocarbons and cycloaliphatic hydrocarbons.

(c) By isolating the polyether/polycarbonates in a devolatilization extruder at temperatures of about 160°–240° C. under the conditions known for polycarbonate extrusion and applying shearing forces.

The polyether/polycarbonates prepared by the process according to the invention are gelled, either in the worked-up organic phase of the two-phase reaction mixture, without isolation, or in a separate solution of the previously isolated polyether/polycabonates in organic solvents, by cooling the high-strength polymer solution, gelling times of between about 5 minutes and 12 hours being required at temperatures between about 0° C. and 40° C., depending on the proportion of polyether or polycarbonate.

The gelled product can be worked up to give a powder grain mixture, the resulting polyether/polycarbonate being dried in vacuo at about 50° C. for 48 hours and at about 100° C. for 24 hours.

Suitable solvents for the separate gelling of the isolated polyether/polycarbonates are organic solvents, such as, for example, methylene chloride, benzene, toluene or xylene.

The heat treatment of the isolated polyether/polycarbonates is carried out for between about 5 minutes and 24 hours at temperatures between 40°C. and 170° C.

The isolated polyether/polycarbonates are subjected to the action of shearing forces for between about 0.5 and 30 minutes, at temperatures between about 130° and 240° C. and applying shearing forces of between about 0.2 and 0.7 KWh per kg of polymer.

The reaction, according to the invention, of the polyalkylene oxide-diol bis-diphenol carbonates, lengthened via carbonate groups, according to the invention, with diphenols and with phosgene by the two-phase interface process takes place quantitatively; the particular reactant ratio of polyalkylene oxide-diol bis-diphenol carbonate, lengthened via carbonate groups, to the other diphenol is thus determined by the polycarbonate constituent and the polyether constituent of the polyether/polycarbonates to be synthesized in each case.

The proportion of polycarbonate in the polyether/polycarbonates prepared by the process according to the invention is between about 30 and 95, preferably between about 35 and 80, % by weight, depending on the desired pattern of properties, the hardness and heat distortion point increasing and the elasticity and elongation at break decreasing with an increasing proportion of polycarbonate.

The proportion of polycarbonate in the polyether/polycarbonates according to the invention is to be understood as the amount by weight of aromatic polycarbonate structural units of the following formula VI

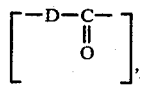

(VI)

wherein

D represents the diphenolate radicals in the polyether/polycarbonate, in particular of aromatic polycarbonate structural units of the formula IVa

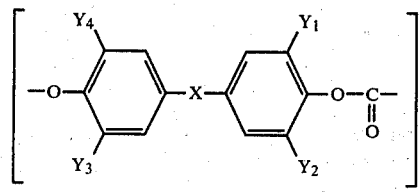

(IVa)

wherein

X and $Y_1$ and $Y_4$ have the meaning given for the formula IV.

The polyether proportion of the polyether/polycarbonates according to the invention is accordingly to be understood as the amount by weight polyalkylene oxide-diolate block units, lengthened via carbonate groups, in particular those of the formula VII

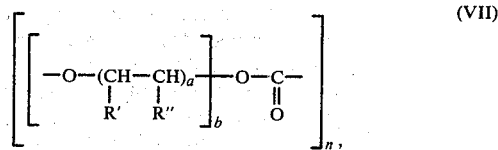

(VII)

wherein

R', R", a and b have the meaning given for the formula I and n denotes an integer of from about 2 to 20, preferably of from about 2–10.

The present invention thus also relates to polyether/polycarbonates, which are characterized in that they consist of about 30 to 95% by weight, preferably of about 35 to 80% by weight, of aromatic polycarbonate structural units of the formula VI, in particular those of the formula IVa, and of about 70 to 5% by weight, preferably of about 65 to 20% by weight, of polyalkylene oxide-diolate block units, lengthened via carbonate groups, in particular those of the formula VII.

Polyether/polycarbonates according to the invention are, for example, those which consist of about 30 to 95% by weight, preferably of about 35 to 80% by weight, of polycarbonate structural units of the formula IVb

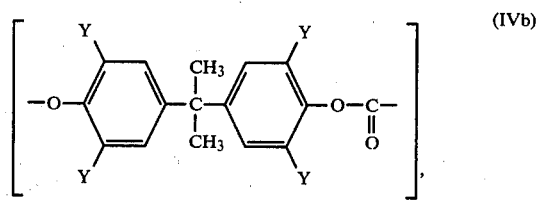

(IVb)

wherein

Y is H, Cl, Br or $CH_3$, and of 70 to 5% by weight, preferably 65 to 20% by weight, of polyalkylene oxide-diolate block units, lengthened via carbonate groups, of the formula VII.

The polyether/polycarbonates according to the invention should have average molecular weights $\overline{M}w$ (weight-average) of between about 25,000 and 250,000, preferably between about 40,000 and 150,000, determined by the light scattering method using a scattered light photometer. The relative solution viscosities $\eta_{rel.}$ (measured on 0.5 g in 100 ml of $CH_2Cl_2$ at 25° C.) of the polyether/polycarbonates according to the invention are between about 1.3 and 3.0, preferably between about 1.4 and 2.6.

The high-molecular, segmented polyether/polycarbonates which are prepared by the process according to the invention and can be processed as thermoplastics are characterized in that, measured by means of differential thermoanalysis, the polyether constituent is present in the amorphous form and has a transformation temperature between about −100° C. and +100° C., preferably between about −80° C. and +20° C., and in that the polycarbonate constituent is present in the partially crystalline form, the crystalline polycarbonate portion having a crystallite melting point of at least about 160° C., preferably between about 165° C. and 250° C., and in that the transformation temperature of the amorphous polycarbonate portion is above about 80° C., preferably above about 100° C.

This difference in the transformation temperature of the polyether constituent and the transformation temperature and crystallite melting point of the polycarbonate constituent is characteristic for the presence of the phase separation between the polyether constituent and the polycarbonate constituent.

The partial crystallinity of the polycarbonate constituent of the polyether/polycarbonates according to the invention, which can be detected by a measureable fusion enthalpy which is at least about 1–8 cal/g of polymer, can be increased by a further 50% by stretching and by the subsequent heat treatment mentioned (5 minutes to 24 hours) at 40°–170° C., or by the action of shearing forces, which has been mentioned, during thermoplastic processing in a multi-screw extruder, whereupon the heat distortion point of the products rises and the appearance changes from transparent to opaque to intransparent.

The partially crystalline elastic polyether/polycarbonates can be processed as thermoplastics at temperatures from about 130° C. to a maximum of about 250° C., in each case below or in the region of the crystallite melting point of the crystalline polycarbonate portion, whereupon a substantial proportion of the crystallinity is retained. Amorphous, transparent products are obtained at processing temperatures above the crystallite melting point of the crystalline polycarbonates portion.

The crystalline portion of the polycarbonate constituent of the polyether/polycarbonates according to the invention can thus be varied and, in order to give a high heat distortion point of the polyether/polycarbonates in practice, is sufficient to give an enthalpy of melting of about 1–8 cal/g of polymer, preferably about 2.5–5.5 cal/g of polymer.

If the polyether/polycarbonates are worked up and isolated according to the invention without heat treatment, without gelling and without the action of shearing forces, single-phase polyether/polycarbonates are obtained, that is to say those products which have only one transformation temperature which can be measured by means of differential thermoanalysis.

The stability of the polyether/polycarbonates according to the invention towards UV light and their stability towards hydrolysis can be improved by amounts of UV stabilizing agents customary for thermoplastic polycarbonates, such as, for example, substituted "benzophenones" or "benztriazoles" by agents which impart stability towards hydrolysis, such as, for example monocarbodiimides and, above all, polycarbodiimides (compare W. Neumann, J. Peter, H. Holtschmidt and W. Kallert, Proceeding of the 4th Rubber Technology Conference, London May 22–25, 1962, pages 738–751) in amounts of 0.2–5% by weight, relative to the weight of the polyether/polycarbonates, and by anti-ageing agents known in the chemistry of thermoplastic polyethers and thermoplastic polycarbonates.

Substances such as, for example, carbon black, kieselguhr, kaolin, clays, $CaF_2$, $CaCO_3$, aluminum oxides and customary glass fibers can be added in amounts of about 2 to 40% by weight, in each case relative to the total weight of the molding composition, and inorganic pigments, both as fillers and as nucleating agents, in order to modify the products according to the invention.

If flame-repellant products are desired, about 5 to 15% by weight, in each case relative to the weight of the polyether/polycarbonates, of flameproofing agents known in the chemistry of thermoplastic polyethers and thermoplastic polycarbonates, such as, for example, antimony trioxide, tetrabromophthalic anhydride, hexabromocyclododecane, tetrachloro- or tetrabromo-bisphenol A or tris-(2,3-dichloro-propyl) phosphate, can be admixed, the tetrachloro- and tetrabromo-bisphenols statistically incorporated into the polycarbonate portions of the polycarbonates according to the invention also exhibiting flame-repellant properties.

Furthermore, processing auxiliaries, such as mold release agents, known in the chemistry of thermoplastic polyethers and thermoplastic polycarbonates can be used effectively.

The polyether/polycarbonates obtained by the process according to the invention can be advantageously used in all instances where a combination of hardness and elasticity, in particular of cold flexibility, is desired, for example in the construction of vehicle bodies, for the manufacture of low-pressure tires for vehicles, for sheathing for hoses, sheets and tubes and for flexible drive pulleys.

The average molecular weights given in the Examples which follow are number-average $\overline{M}_n$ and are ascertained by determining the OH number.

The Staudinger index $[\eta]$ given in Example 5 was measured in tetrahydrofurane at 25° C. and is given in dl/g.

For the definition of the Staudinger index see: H. G. Elias: 'Makromoleküle' ('Macromolecules'), Hüthig & Wepf-Verlag, Basle, page 265.

The relative solution viscosity $\eta_{rel}$ of Examples 7a–7f is defined as the viscosity of 0.5 g polyether/polycarbonate in 100 ml of methylene chloride at 25° C.

The tensile strength and the elongation at break were measured according to DIN 53,455; the corresponding U.S. equivalent is ASTM D-638.

Investigations by gel chromatography were carried out in tetrahydrofurane using Styragel columns (separation range $1.5 \times 10^5$ Å, $1 \times 10^5$ Å, $3 \times 10^4$ Å and $2 \times 10^3$ Å) at room temperature.

The calibration of bisphenol A polycarbonate was used for the determination. In comparison with the $\overline{M}_w$ determination by the light-scattering method, no large deviations were found.

The differential thermoanalysis (DTA) was carried out with the "DuPont, Model 900" apparatus. For the interpretation of the transformation temperature, the approximate middle of the softening range, according to the tangent method, was chosen and for the crystallite melting point the approximate middle of the endothermic peak of the melting curve was chosen.

EXAMPLE 5

2,000 parts by weight of polytetrahydrofurane-diol with a molecular weight $\overline{M}_n$ of 2,000 and with a GPC curve represented by curve (1) in diagram 1, 321 parts by weight of diphenyl carbonate and 0.1 part by weight of sodium phenolate and 0.2 part by weight of 2,6-di-tert.-butyl-p-cresol are heated, while stirring and under nitrogen and a vacuum of 6 mm Hg, at 110° C. for 1.5 hours, 130° C. for 2 hours and 150° C. for 2 hours. During this time, phenol is distilled off from the reaction mixture. If desired, residual traces of phenol can subsequently be separated off in a thin film evaporator at 190° C./0.1 mm Hg. A colorless, viscous oil with a molecular weight $\overline{M}_n$ of 4,200 and a Staudinger index $[\eta]_{THF}=0.24$ is obtained. The OH number is zero. The GPC curve of this product is given as curve (2) in diagram 1.

EXAMPLE 6a

Preparation of a polytetrahydrofurane-diol bis-(bisphenol A) carbonate which also contains 1% by weight of bisphenol A.

2,100 parts by weight of the bis-carbonic acid monoaryl ester which has been prepared according to Example 5 of a polytetrahydrofurane-diol, lengthened via carbonate groups, of average molecular weight $\overline{M}n=4,200$, 251.1 parts by weight of 2,2-bis-(4-hydroxyphenyl)-propane (bisphenol A) and 0.3 part by weight of catalyst (sodium bisphenolate of bisphenol A to bisphenol A = 1:100) are heated, while stirring and under a nitrogen atmosphere, at 150° C. for 9 hours and under 0.3 mm Hg. During this time, phenol is distilled off from the reaction mixture. The reaction product obtained is a clear, viscous oil.

EXAMPLE 6b

Preparation of a polytetrahydrofurane-diol bis-(bisphenol A) carbonate, lengthened via carbonate groups, which also contains 3.7% by weight of bisphenol A.

320 parts by weight of the bis-carbonic acid monoaryl ester, which has been prepared according to Example 5, of polytetrahydrofurane-diol, lengthened via carbonate groups, of average molecular weight $\overline{M}n=3,200$, 59.4 parts by weight of 2,2-bis-(4-hydroxyphenyl)-propane (bisphenol A) and 0.01 part by weight of sodium phenolate are heated, while stirring and under a nitrogen atmosphere, first at 125° C. for 1 hour and thereafter at 150° C. for 4 hours and under 0.5 mm Hg. The reaction product obtained is a clear viscous oil.

EXAMPLE 6c

Preparation of a polypropylene oxide-diol bis-(bisphenol A) carbonate, lengthened via carbonate groups, which also contains 3% by weight of bisphenol A.

315 parts by weight of the bis-carbonic acid monoaryl ester, which has been prepared according to Example 5, of a polypropylene oxide-diol, lengthened via carbonate groups, of average molecular weight $\overline{M}n=4,200$, 44.5 parts by weight of bisphenol A and 0.05 part by weight of catalyst (sodium bisphenolate of bisphenol A to bisphenol A = 1:100) are heated, while stirring and under a nitrogen atmosphere, at 125° C. for one hour and thereafter at 150° C. and 5 hours and under 0.8 mm Hg. During this time, phenol is distilled off from the reaction mixture. The product obtained is a clear, viscous oil.

EXAMPLE 6d

Preparation of a polytetrahydrofurane-diol bisdiphenol carbonate, lengthened via carbonate groups, of the formula Vf, which also contains 3.6% by weight of 2,2-bis-(3,5-dimethyl-4-hydroxyphenyl)-propane.

315 parts by weight of the bis-carbonic acid monoaryl ester, which has been prepared according to Example 5, of a polytetrahydrofurane-diol, lengthened via carbonate groups, of average molecular weight $\overline{M}n$ 4,200, 55.5 parts by weight of 2,2-bis-(3,5-dimethyl-4-hydrophenyl)-propane and 0.25 part by weight of catalyst (sodium bisphenolate of bisphenol A:bisphenol A = 1:100) are heated, while stirring and under a nitrogen atmosphere, first at 125° C. for one hour and thereafter at 150° C. for 4 hours and under 0.1 mm Hg. A clear, viscous oil is obtained.

EXAMPLE 6e

Preparation of a polypropylene oxide-diol bisdiphenol carbonate, lengthened via carbonate groups, of the formula Vf, which also contains 2.5 parts by weight of 2,2-bis-(3,5-dimethyl-4-hydroxyphenyl)-propane.

310 parts by weight of the bis-carbonic acid monoaryl ester, which has been prepared according to Example 5, of a polypropylene oxide-diol, lengthened via carbonate groups, of average molecular weight $\overline{M}n$ 6,200, 37 parts by weight of 2,2-bis-(3,5-dimethyl-4-hydroxyphenyl)-propane and 0.02 part by weight of catalyst (sodium bisphenolate of bisphenol A:bisphenol A = 1:100) are heated, while stirring and under a nitrogen atmosphere, first at 125° C. for one hour and thereafter at 150° C. for 4 hours and under 0.05 mm Hg. A clear viscous oil is obtained.

EXAMPLE 7a

Preparation of the polyether/polycarbonate with a polyether proportion of 50% by weight.

2,264 parts by weight of this viscous oil from Example 6a, dissolved in 30 liters of $CH_2Cl_2$, are added to a solution of 1,545 parts by weight of 2,2-bis-(4-hydroxyphenyl)-propane (bisphenol A) and 47.2 parts by weight of p-tert.-butylphenol in 1,400 parts by weight of 45 percent strength NaOH and 30 liters of distilled water.

1,167 parts by weight of phosgene are passed in at 20°–25° C. in the course of 40 minutes, while stirring and under a nitrogen atmosphere. During the introduction, 1,730 parts by weight of 45% strength NaOH are simultaneously added drop-wise so that the pH value remains constant at pH 13. After passing in the phosgene, 7.9 parts by weight of triethylamine are added and the mixture is stirred for 1 hour. The organic phase is separated off and washed successively with 2% strength phosphoric acid and finally with distilled water until free from electrolytes. After separating off the water, the organic phase can be worked up by the following processes.

7a.1 A high-strength (about 30–40% by weight) polymer solution is obtained by distilling off the $CH_2Cl_2$ down to a certain concentration or by adding chlorobenzene to the organic phase and distilling off the entire methylene chloride. The polyether/polycarbonate gels by subsequently slowly evaporating off the remaining methylene chloride or the chlorobenzene and can be further worked up to a powder grain mixture. The resulting polyether/polycarbonate is dried at 50° C. for 48 hours and 100° C. for 24 hours.

7a.2 A finely divided solid product is obtained by distilling off the solvent, drying the residue in a vacuum drying cabinet at about 80°–110° C. and under 15 mm Hg and subsequently grinding it.

7a.3 By precipitating the polyether/polycarbonate from the organic phase using, for example, methanol, ethanol, acetone, aliphatic hydrocarbons and cycloaliphatic hydrocarbons, and subsequently drying the precipitate in a vacuum drying cabinet at 80°–110° C. and under 15 mm Hg.

7a.4 By concentrating the organic phase in an evaporation extruder and subsequent extrusion at about 160°–240° C. under the conditions which are known for polycarbonate extrusion.

The relative viscosity of the polyether/polycarbonate obtained according to 7a.1–7a.4 $\eta_{rel}=1.52$ (measured in $CH_2Cl_2$ at 25° C. and c=5 g/l). According to a determination by gel chromatography, the polyether/polycarbonate exhibits a maximum at 40,000. It contains 50% by weight of polyether and has a polycarbonate proportion of 50% by weight. Some mechanical properties of a film cast out of methylene chloride are: tensile strength 45.9 (MPA) (measured according to DIN 53,455-ASTM D-638), elongation at break 483% (measured according to DIN 53,455-ASTM D-638).

According to differential thermoanalysis of the granular polyether/polycarbonate, the polyether constituent has a glass transition temperature of −75° C., the polycarbonate has a glass transition temperature of 145° C. and the polycarbonate constituent has a crystallite melting point of about 215° C.

EXAMPLE 7b

Preparation of a polyether/polycarbonate with a polyether proportion of 60% by weight.

134.3 parts by weight of the viscous oil from Example 6a, dissolved in 1,725 parts by weight of methylene chloride, are added to a solution of 58.2 parts by weight of 2,2-bis-(4-hydroxyphenyl)-propane (bisphenol A) and 1.42 parts by weight of p-tert.-butylphenol in 1,300 parts by weight of distilled water and 56 parts by weight of 45% strength sodium hydroxide solution. 85.6 parts by weight of phosgene are passed into the mixture in the course of 45 minutes, while stirring and under a nitrogen atmosphere, 95 parts by weight of 45% strength sodium hydroxide solution being simultaneously added dropwise in order to keep the pH constant at 13. After passing in the phosgene, 0.32 part by weight of triethylamine is added. The mixture becomes more viscous. After 1 hour, the organic phase is separated off and the polyether/polycarbonate is isolated as described in Example 7a (working up 7a.1–7a.4).

The relative viscosity of the polyether/polycarbonate $\eta_{rel}$ is 1.62 (in $CH_2Cl_2$).

EXAMPLE 7c

Preparation of a polyether/polycarbonate with a polyether proportion of 50% by weight.

120.6 parts by weight of the viscous oil from Example 6b, dissolved in 1,725 parts by weight of methylene chloride, are added to a solution of 70 parts by weight of 2,2-bis-(4-hydroxyphenyl)-propane (bisphenol A) and 1.77 parts by weight of p-tert.-butylphenol in 1,300 parts by weight of distilled water and 70 parts by weight of 45% strength sodium hydroxide solution. 58.3 parts by weight of phosgene are passed into the mixture in the course of 45 minutes, while stirring and under a nitrogen atmosphere, 135 parts by weight of 45% strength sodium hydroxide solution being simultaneously added dropwise in order to keep the pH constant at 13. After passing in the phosgene, 0.4 part by weight of triethylamine is added. The mixture becomes more viscous. After 1 hour, the organic phase is separated off and the polyether/polycarbonate is isolated as described in Example 7a (working up 7a.1–7a.4).

The relative viscosity of the polyether/polycarbonate $\eta_{rel}$ is 1.54 (in $CH_2Cl_2$).

EXAMPLE 7d

Preparation of a polyether/polycarbonate with a polyether proportion of 50% by weight.

115.3 parts by weight of the viscous oil from Example 6c, dissolved in 1,725 parts by weight of methylene chloride, are added to a solution of 65 parts by weight of 2,2-bis-(4-hydroxyphenyl)-propane (bisphenol A) and 1,300 parts by weight of distilled water and 70 parts by weight of 45% strength sodium hydroxide solution. 58.3 parts by weight of phosgene are passed into the mixture in the course of 45 minutes, while stirring and under a nitrogen atmosphere, 135 parts by weight of 45% strength sodium hydroxide solution being simultaneously added dropwise in order to keep the pH constant at 13. After passing in the phosgene, 0.4 part by weight of triethylamine is added. The mixture becomes more viscous. After 1 hour, the organic phase is separated off and the polyether/polycarbonate is isolated as described in Example 7a, (working up 7a.1–7a.4).

The relative viscosity of the polyether/polycarbonate $\eta_{rel}$ is 2.05 (in $CH_2Cl_2$).

According to differential thermoanalysis of the granular polyether/polycarbonate, the polyether constituent has a glass transition temperature −57° C., the polycarbonate has a glass transition temperature of 145° C. and the polycarbonate constituent has a crystallite melting point of about 195° C.

EXAMPLE 7e

Preparation of a polyether/polycarbonate from 2,2-bis-(3,5-dimethyl-4-hydroxyphenyl)-propane with a polyether proportion of 50% by weight.

119 parts by weight of the viscous oil from Example 6d and 0.6 part by weight of tributylamine (=1 mol % per mol of bisphenol units), dissolved in 1,725 parts by weight of methylene chloride, are added to a solution of 73.2 parts by weight of 2,2-bis-(3,5-dimethyl-4-hydroxyphenyl)-propane in 57.3 parts by weight of 45% strength sodium hydroxide solution and 1,300 parts by weight of distilled water. 95.6 parts by weight of phosgene are passed into the mixture in the course of 30 minutes, while stirring and under a nitrogen atmosphere, 235 parts by weight of 45% strength sodium hydroxide solution being simultaneously added dropwise in order to keep the pH constant at 13. After passing in the phosgene, 5.4 parts by weight of tributylamine (=9 mol % per mol of bisphenol units) are added in order to bring the condensation reaction to completion. The mixture becomes more viscous. After 3 hours, the organic phase is separated off and the polyether/polycarbonate is isolated as described in Example 7a, (working up 7a.1).

The relative viscosity of the polyether/polycarbonate $\eta_{rel}$ is 1.63 (in $CH_2Cl_2$).

EXAMPLE 7f

Preparation of a polyether/polycarbonate from 2,2-bis-(3,5-dimethyl-4-hydroxyphenyl)-propane with a polyether proportion of 50% by weight.

112.8 parts by weight of the viscous oil from Example 6e and 0.6 part by weight of tributylamine (=1 mol % per mol of bisphenol units), dissolved in 1,725 parts by weight of methylene chloride, are added to a solution of 79.3 parts by weight of 2,2-bis-(3,5-dimethyl-4-hydroxyphenyl)-propane in 57.3 parts by weight of 45% strength sodium hydroxide solution and 1,300 parts by weight of distilled water. 95.6 parts by weight of phosgene are passed into the mixture in the course of 30 minutes, while stirring and under a nitrogen atmosphere, 235 parts by weight of 45% strength sodium hydroxide solution being simultaneously added dropwise in order to keep the pH constant at 13. After passing in the phosgene, 5.4 parts by weight of tributylamine (=9 mol % per mol of bisphenol units) are added in order to bring the condensation reaction to completion. The mixture becomes more viscous. After 3 hours, the organic phase is separated off and the polyether/polycarbonate is isolated as described in Example 7a, (working up 7a.1).

The relative viscosity of the polyether/polycarbonate $\eta_{rel}$ is 1.66 (in $CH_2Cl_2$).

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a polyalkylene oxide-diol-bis-diphenol carbonate, lengthened via carbonate groups, comprising:
    i. heating a polyalkylene oxide-diol having a molecular weight $\overline{M}n$ (number average) of over 135 with a carbonic acid bis-aryl ester
        a. at a temperature of between about 100° C. and 200° C.,
        b. in vacuo below about 35 mm Hg, and
        c. in the presence of a catalyst,
    characterized in that less than 1 mol of carbonic acid bis-aryl ester is employed per mol of OH-groups of the polyalkylene oxide-diol, and
    ii. heating the resulting polyalkylene oxide-diol bis-aryl carbonate with a diphenol
        a. at a temperature of between about 100° C. and 200° C.,
        b. in vacuo below about 35 mm Hg, and
        c. in the presence of a catalyst,
    characterized in that more than one mol of diphenol is employed per mol of carbonic acid aryl ester groups of the polyalkylene oxide-diol bis-aryl carbonate.

2. The process according to claim 1, wherein the resulting polyalkylene oxide-diol bis-aryl carbonate and excess carbonic acid bis-aryl ester are reacted with a diphenol.

3. The process according to claim 1, wherein the polyalkylene oxide-diol has the general formula:

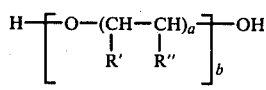

wherein
R' and R" independently of one another are H or $C_1$–$C_4$ alkyl,
a is an integer of from about 1 to 6, and
b is an integer of from about 3 to 350.

4. The process according to claim 1, wherein the polyalkylene oxide-diol bis-aryl carbonate has the general formula:

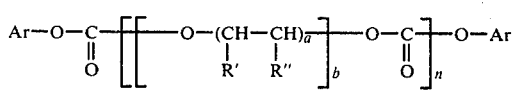

wherein
R' and R" independently of one another are H or $C_1$–$C_4$ alkyl,
a is an integer of from about 1 to 6,
b is an integer of from about 3 to 350,
n is an integer of from about 2 to 20, and
Ar is a substituted or unsubstituted aryl radical with from about 6 to 18 C atoms.

5. The process according to claim 1, wherein the diphenol has the general formula:

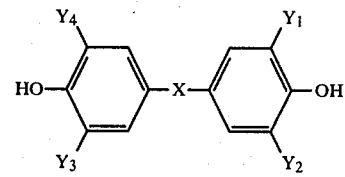

wherein
X denotes $-CH_2-$,

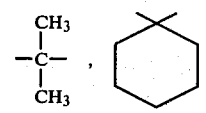

O, S or $SO_2$, and
$Y_1$ to $Y_4$ are identical or different and denote hydrogen or halogen.

6. The process according to claim 1, wherein the molecular weight of the polyalkylene oxide-diol is above about 800.

7. The process according to claim 1, wherein the reaction temperature is between about 110° C. and 180° C.

8. The process according to claim 1, wherein the pressure is between about 25 mm and 0.1 mm Hg.

9. The process according to claim 1, wherein the amount of diphenol is between about 1.1 and about 2 mols, per carbonic acid aryl ester group of the polyalkylene oxide-diol bis-aryl carbonates.

10. The process according to claim 1, when carried out in the absence of a solvent.

11. The process according to claim 1, when carried out in the presence of an inert solvent.

12. The process according to claim 1, wherein a polyalkylene oxide-diol bis-phenol carbonate is reacted with bisphenol-A
    a. in a molar ratio of bis-phenol carbonate to bis-phenol-A of about 1:3,
    b. in the presence of the disodium phenolate of bisphenol-A as the catalyst,
    c. at a temperature of about 150° C., and
    d. in vacuo below about 25 mm and 0.1 mm Hg.

13. A polyalkylene oxide-diol bis-diphenol carbonate, lengthened via carbonate groups, prepared by the process according to claim 1.

14. A polyalkylene oxide diol bis-diphenol carbonate of the formula:

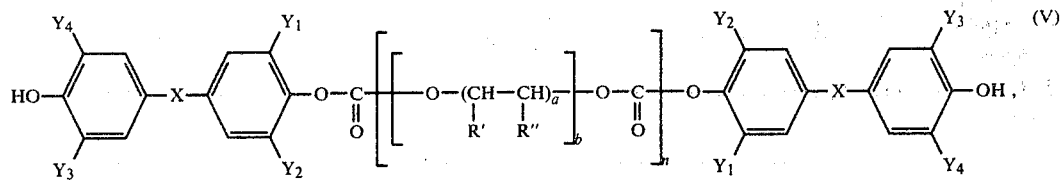

wherein
R' and R" independently of one another are H or C$_1$-C$_4$ alkyl,
a is an integer of from about 1 to 6,
b is an integer of from about 3 to 350,
n is an integer of from about 2 to 20,
Y$_1$ and Y$_4$ are identical or different and denote hydrogen or halogen, and
X denotes —CH$_2$—,

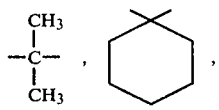

O, S or SO$_2$.

15. A polyalkylene oxide-diol bis-diphenol carbonate of the formula:

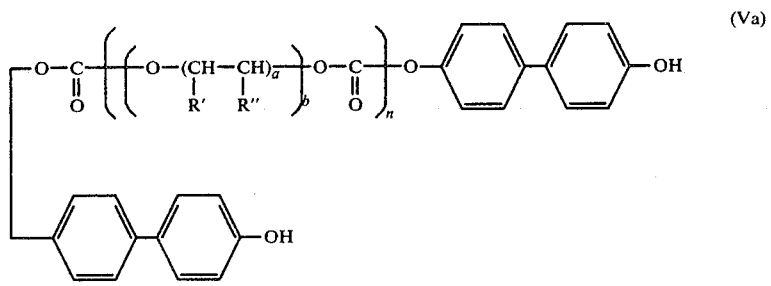

wherein,
R' and R" independently of one another are H or C$_1$-C$_4$ alkyl,
a is an integer of from about 1 to 6,
b is an integer of from about 3 to 350, and
n is an integer of from about 2 to 20.

16. A polyalkylene oxide-diol bis-diphenol carbonate of the formula:

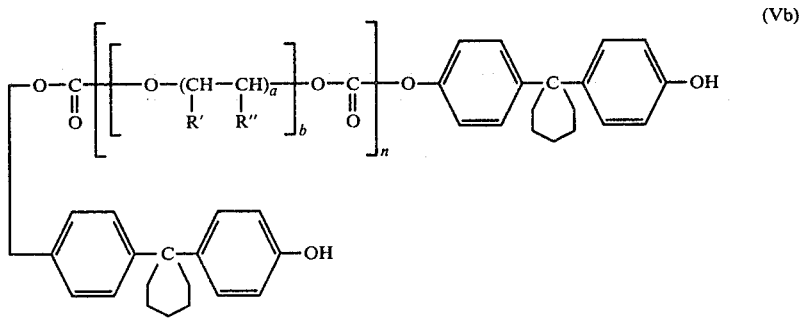

wherein
R' and R" independently of one another are H or C$_1$-C$_4$ alkyl,
a is an integer of from about 1 to 6,
b is an integer of from about 3 to 350, and
n is an integer of from about 2 to 20.

17. A polyalkylene oxide-diol bis-diphenol carbonate of the formula:

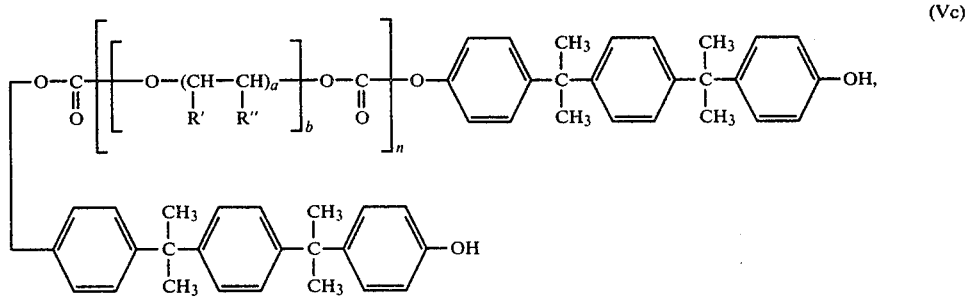

wherein
R' and R" independently of one another are H or $C_1$–$C_4$ alkyl,
a is an integer of from about 1 to 6,
b is an integer of from about 3 to 350, and
n is an integer of from about 2 to 20.

18. A polyalkylene oxide-diol bis-diphenol carbonate of the formula:

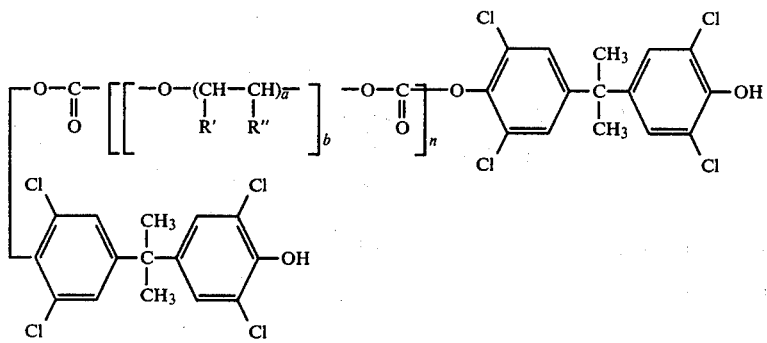
(Vd)

wherein
R' and R" independently of one another are H or $C_1$–$C_4$ alkyl,
a is an integer of from about 1 to 6,
b is an integer of from about 3 to 350, and
n is an integer of from about 2 to 20.

19. A polyalkylene oxide-diol bis-diphenol carbonate of the formula:

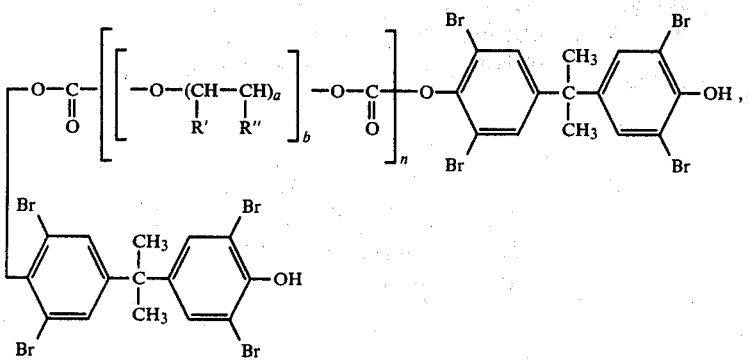
(Ve)

wherein
R' and R" independently of one another are hydrogen or $C_1$–$C_4$ alkyl,
a is an integer of from about 1 to 6,
b is an integer of from about 3 to 350, and
n is an integer of from about 2 to 20.

20. A polyalkylene oxide-diol bis-diphenol carbonate of the formula:

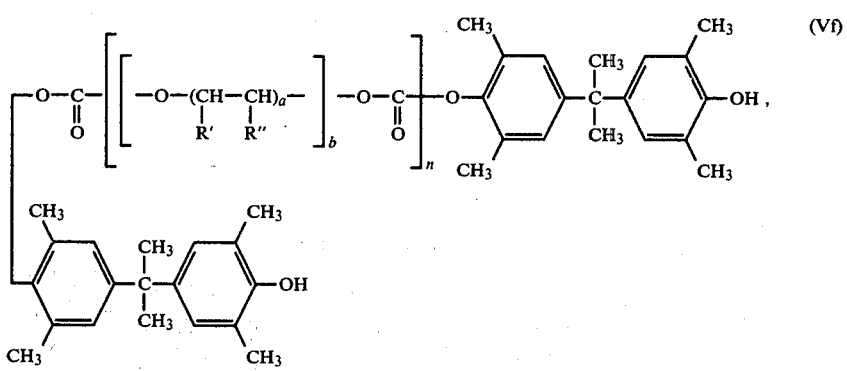
(Vf)

wherein
R' and R" independently of one another are H or $C_1$–$C_4$ alkyl,
a is an integer of from about 1 to 6,
b is an integer of from about 3 to 350, and
n is an integer of from about 2 to 20.

21. A polyalkylene oxide-diol bis-diphenol carbonate of the formula:

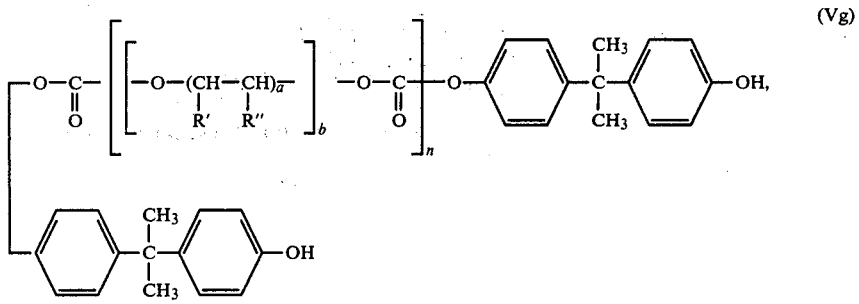

(Vg)

wherein R' and R" independently of one another are H or $C_1$-$C_4$ alkyl, a is an integer of from about 1 to 6,
b is an integer of from about 3 to 350, and
n is an integer of from about 2 to 20.

22. A polyalkylene oxide-diol bis-diphenol carbonate of the formula:

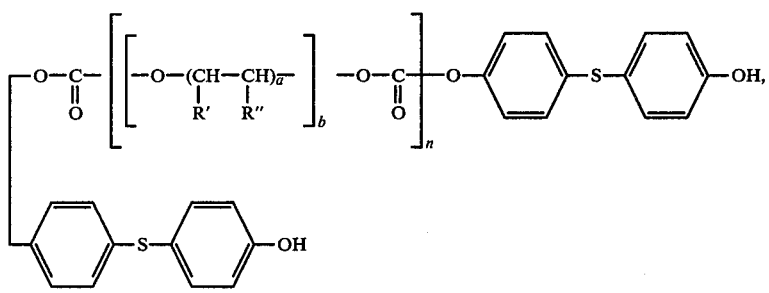

(Vh)

wherein
R' and R" independently of one another are H or $C_1$-$C_4$ alkyl,
a is an integer of from about 1 to 6,
b is an integer of from about 3 to 350, and
n is an integer of from about 2 to 20.

23. A process for the preparation of a polyether/polycarbonate, comprising reacting a polyalkylene oxide-diol bis-diphenol carbonate prepared by the process according to claim 1 with a diphenol and phosgene in a liquid mixture comprising an inert organic solvent and an alkaline aqueous solution, at a temperature of from about 0° to about 80° C., at a pH value of from about 9 to 14, wherein after the addition of phosgene, polycondensation is carried out by adding from about 0.2 mol % to 10 mol %, relative to the molar amount of diphenol of a tertiary amine, the weight ratio of polyalkylene oxide-diol bis-diphenol carbonate to the diphenol being determined by the desired proportion of polycarbonate and the proportion of polyether in the resulting polyether/polycarbonate.

24. The process according to claim 23, wherein the diphenol has the general formula:

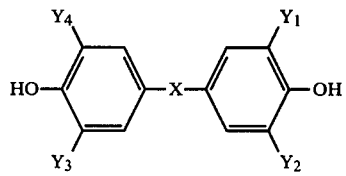

(IV)

wherein

X denotes —$CH_2$—,

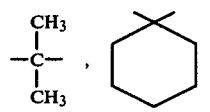

O, S or $SO_2$, and
$Y_1$ to $Y_4$ are identical or different and denote hydrogen or halogen.

25. The process according to claim 23, wherein the tertiary amine has from about 3 to about 15 C atoms per amine molecule.

26. The process according to claim 23, wherein between about 0.05 and about 2 mol % of trifunctional or more than trifunctional compounds are employed.

27. The process according to claim 23, wherein the polyether/polycarbonate is subjected to gelling, shearing or heat treatment in the course of isolation whereby the recovered polymer is multi-phase.

28. The process according to claim 23, wherein the polyether/polycarbonate is not subjected to gelling, shearing or heat treatment in the course of isolation whereby the recovered polymer is single-phase.

29. A polyether/polycarbonate comprising from about 30 to about 95% by weight of aromatic polycarbonate structural units of the formula:

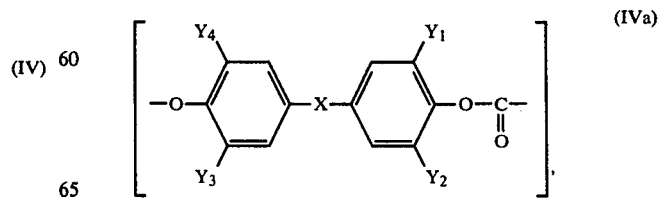

(IVa)

wherein
X denotes —$CH_2$—,

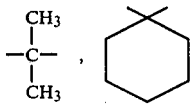

O, S or SO$_2$, and

Y$_1$ to Y$_4$ are identical or different and denote hydrogen or halogen, and of from about 70 to 5% by weight of polyalkylene oxide-diol block units. lengthened via carbonate groups, of the formula:

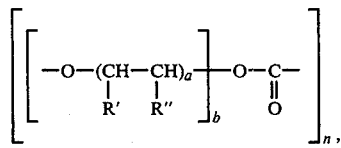

wherein,

R' and R" independently of one another are H or C$_1$-C$_4$ alkyl, a is an integer of from about 1 to 6, b is an integer of from about 3 to 350, and n is an integer of from about 2 to 20.

30. The polyether/polycarbonate according to claim 29, wherein from about 35 to 80% by weight of the structural units of the formula IVa and from about 65 to 20% by weight of the block units of the formula VII are employed.

31. The polyether/polycarbonate according to claim 29, wherein the average molecular weight $\overline{M}w$ (weight-average) of the polyether/polycarbonate is between about 25,000 and about 250,000.

32. The polyether/polycarbonate according to claim 29, wherein the aromatic polycarbonate structural units have the formula:

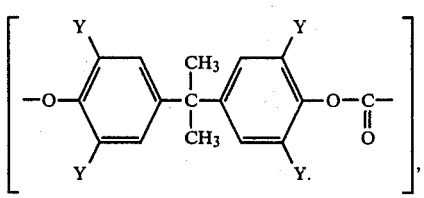

wherein

Y is H, Cl, Br or CH$_3$.

33. The product of the process of claim 23.

* * * * *